(12) United States Patent
Martoch et al.

(10) Patent No.: US 8,814,404 B2
(45) Date of Patent: Aug. 26, 2014

(54) FEEDING DEVICE FOR A GEOMETRICALLY CLOSED LIGHTGUIDE

(71) Applicants: Jan Martoch, Havlickova (CZ); Tomas Nejezchleba, Novy Jicin (CZ)

(72) Inventors: Jan Martoch, Havlickova (CZ); Tomas Nejezchleba, Novy Jicin (CZ)

(73) Assignee: Varroc Lighting Systems, S.R.O. (CZ)

( * ) Notice: Subject to any disclaimer, the term of this patent is extended or adjusted under 35 U.S.C. 154(b) by 0 days.

(21) Appl. No.: 13/973,431

(22) Filed: Aug. 22, 2013

(65) Prior Publication Data

US 2014/0056015 A1 Feb. 27, 2014

(30) Foreign Application Priority Data

Aug. 22, 2012 (CZ) .................................. 2012-562

(51) Int. Cl.
*F21S 8/10* (2006.01)
*F21S 8/12* (2006.01)

(52) U.S. Cl.
CPC ............. *F21S 48/236* (2013.01); *G02B 6/0018* (2013.01); *F21S 48/2237* (2013.01); *F21S 48/2268* (2013.01); *G02B 6/0031* (2013.01); *G02B 6/0028* (2013.01)
USPC .......................................... 362/487; 362/485

(58) Field of Classification Search
CPC ...... F21S 48/236; F21S 48/215; F21S 48/212
USPC ......................................... 362/487, 485–486
See application file for complete search history.

(56) References Cited

U.S. PATENT DOCUMENTS

| 6,746,140 B2 * | 6/2004 | Ichikawa et al. ............... 362/494 |
| 8,328,401 B2 * | 12/2012 | Matsunaga .................... 362/545 |
| 2012/0033441 A1 * | 2/2012 | Sousek et al. ................. 362/555 |
| 2013/0003397 A1 * | 1/2013 | Buisson ........................ 362/511 |

* cited by examiner

*Primary Examiner* — Tracie Y Green
(74) *Attorney, Agent, or Firm* — Cantor Colburn LLP

(57) ABSTRACT

Feeding device for a geometrically closed lightguide (1) of the signal lamps of motor vehicles placed on both sides of the vehicle comprising a light feeder (4) and a geometrically closed lightguide (1). The two parts are joined and form a single plastic molding. A prism-shaped cavity (9) with total internal light reflection for a uniform light distribution at both sides of the enclosed lightguide (1) is formed at the site of their joint. A semi-transparent insert (16) is inserted in the prism-shaped cavity (9), made of material with a precise ratio of transparent and cloudy components to control the amount of unwanted light arising on the planar surfaces (10;11) of the prism-shaped cavity (9) with total internal light reflection.

6 Claims, 7 Drawing Sheets

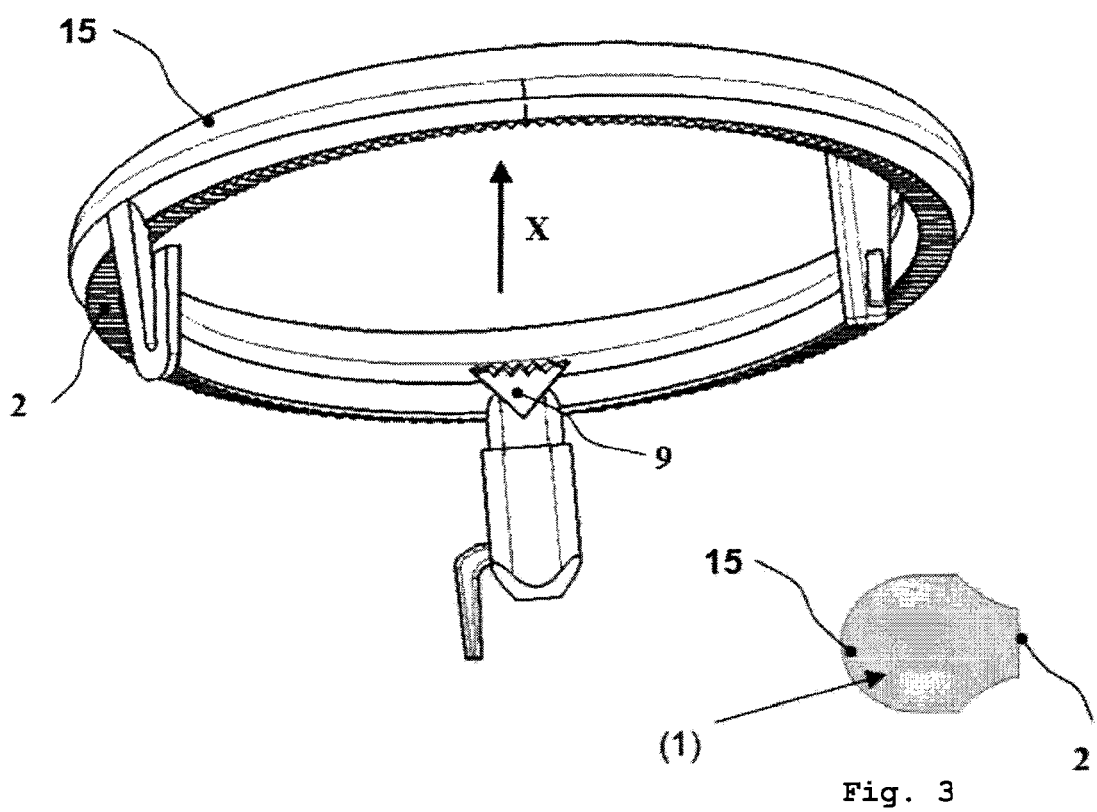

Figure 1:
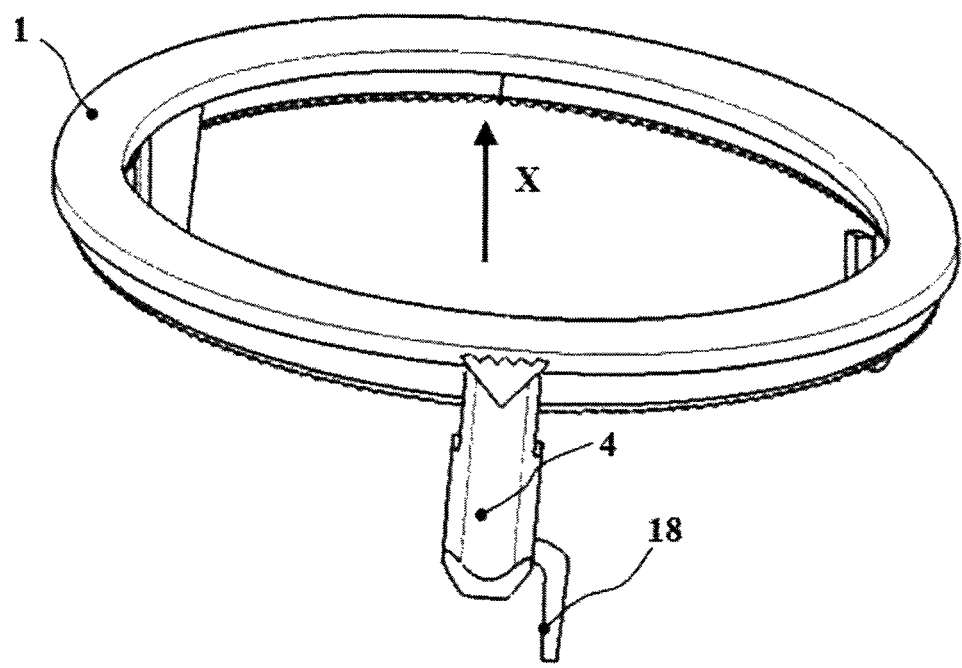

Fig. 4
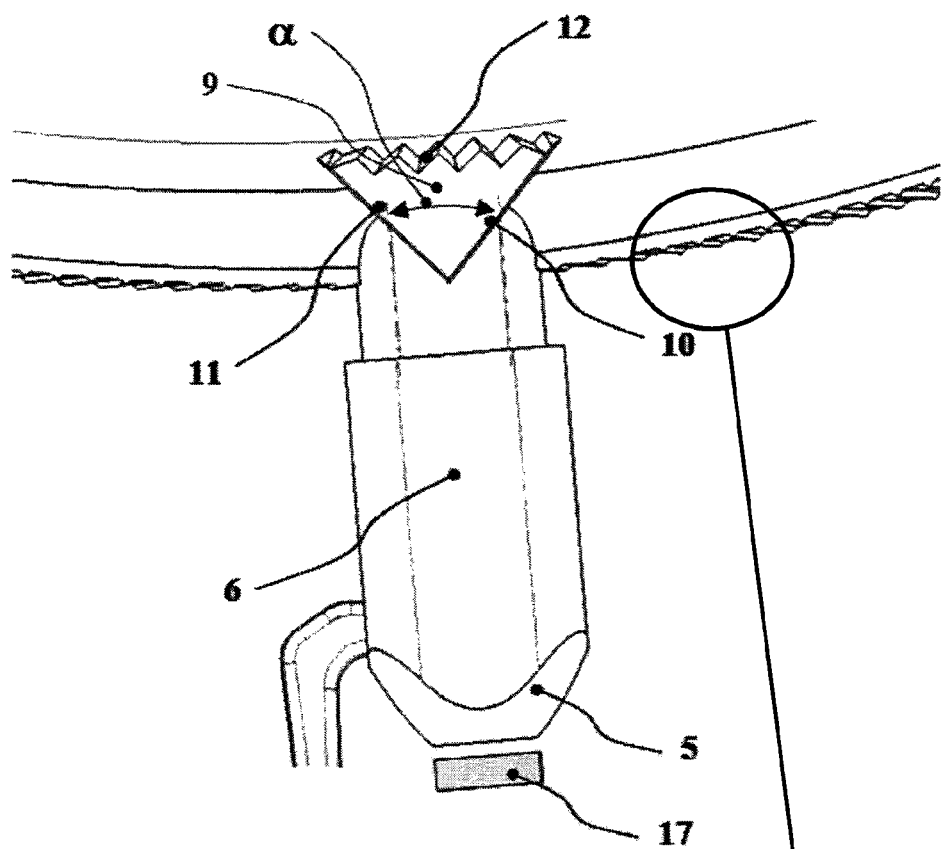
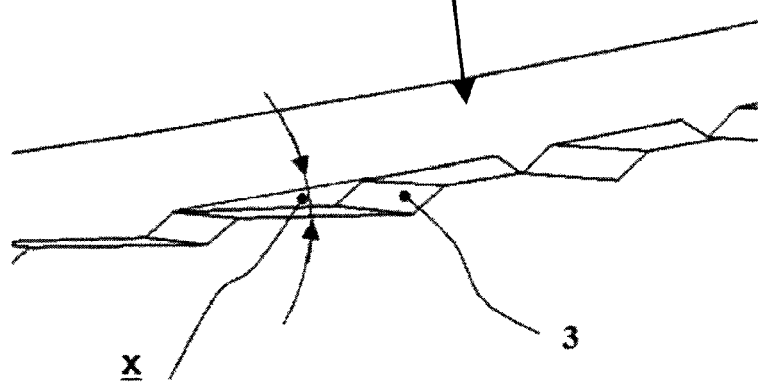
Fig. 5

FEEDING DEVICE FOR A GEOMETRICALLY CLOSED LIGHTGUIDE

The feeding device of lightguide applications is designed especially for signal lamps of motor vehicles. The optical system of the lighting device consists of an input light collimator made of transparent material, connected to a light conductor with a TIR prism, which supplies light to an optical lightguide constituting the final optical system.

The total internal reflection (TIR) prism is covered by a semi-transparent insert, which reduces unwanted light passing through the TIR prism, and which has a harmful impact on the uniform distribution of the light emerging from the overall optical system.

FIELD OF TECHNOLOGY

The invention relates to the construction of the front and rear signal lamps of motor vehicles operating in ground transportation.

PRIOR ART

Lightguides or planar lightguides work by the principle of total internal reflection of light. This principle is used to create attractive styling features in exterior automotive lighting. Modern lightguides are designed in the most diverse forms, for the most part as lines serving to illuminate some prominent contour, which can be partly enclosed in order to encircle the reflector chamber. For these linear types of lightguides, the light feed is designed such that the lightguide has an optical element at its end, against which the light source is placed.

The current state of technology now allows us to have an open form of lightguide, i.e., one not encircling the entire chamber, and for which it is necessary to define a place on the lightguide where the light source feeding the lightguide will be placed and which has to be covered by part of the lamp mask or another suitable cover to avoid the creation of a spot with much higher brightness caused by the stray light of the light source.

ESSENCE OF THE INVENTION

The indicated drawbacks are eliminated and the goals achieved according to the invention by a feeding device for a geometrically enclosed lightguide of signal lamps of motor vehicles situated on both sides of the vehicle, the essence of which is that it consists of a light feed and a geometrically enclosed lightguide, where both parts are joined and form a common plastic molding, wherein a prism-shaped cavity with total internal reflection of light to both sides of the enclosed lightguide is created at the site of their joint, and in the prism-shaped cavity is inserted a semi-transparent insert made of material with a precise ratio of transparent and cloudy components to control the amount of stray light arising on the planar surfaces of the prism-shaped cavity with total internal light reflection, and also the prism-shaped cavity has on its upper surface a structure of fine prisms, focusing on the decoupling elements of the lightguide in order to preserve the relative homogeneity of the overall lightguide including the region of the light feed in the unlit state, or the light feed has at its input part an optical collimator, concentrating light from a light source and directing the beams directly onto the prism-shaped cavity with total internal light reflection.

Another essence of the invention is that the optical insert that is placed in the prism-shaped opening with total internal light reflection is independently secured in a notch of the light conductor, and also the optical insert is provided with fixation elements for its precise clamping in the notch of the light conductor and for shielding against the light beams passing around the optical insert, or that the light source is LED diodes.

It is advantageous that the optical device which is part of the lightguide itself provides the method of feeding the lightguide so as to achieve a geometrically enclosed shape. The lightguide then encircles the reflector or projector chamber and thereby creates a closed boundary of the lamp without producing a site with elevated brightness in the area of the lightguide which feeds this geometrically enclosed lightguide.

EXPLANATION OF THE FIGURES IN THE DRAWINGS

Figure 6:
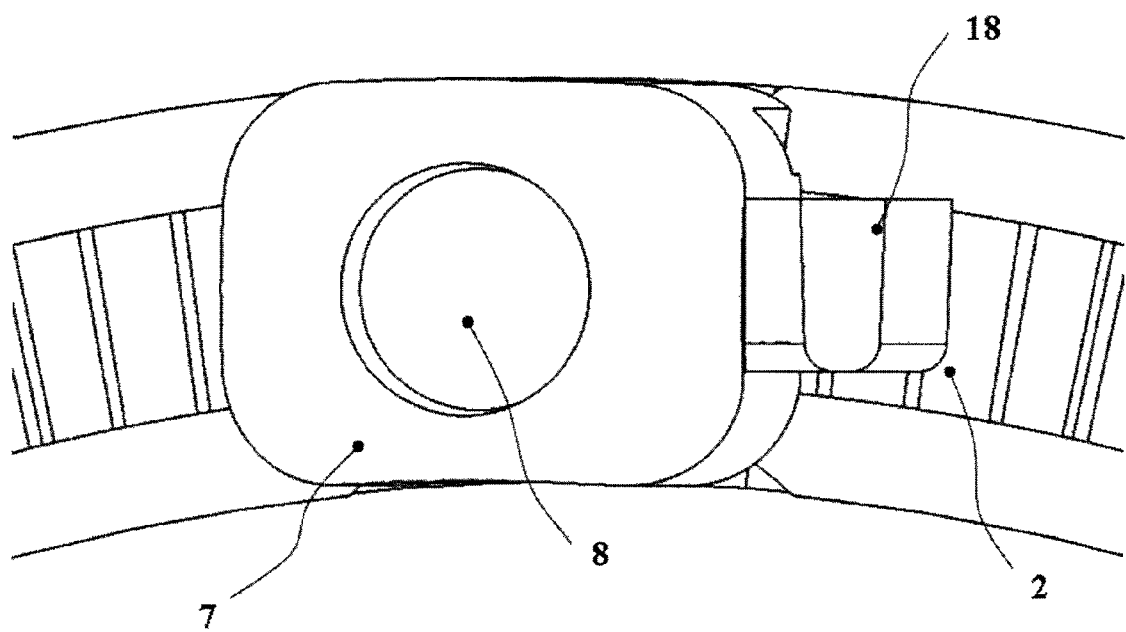
Figure 7:
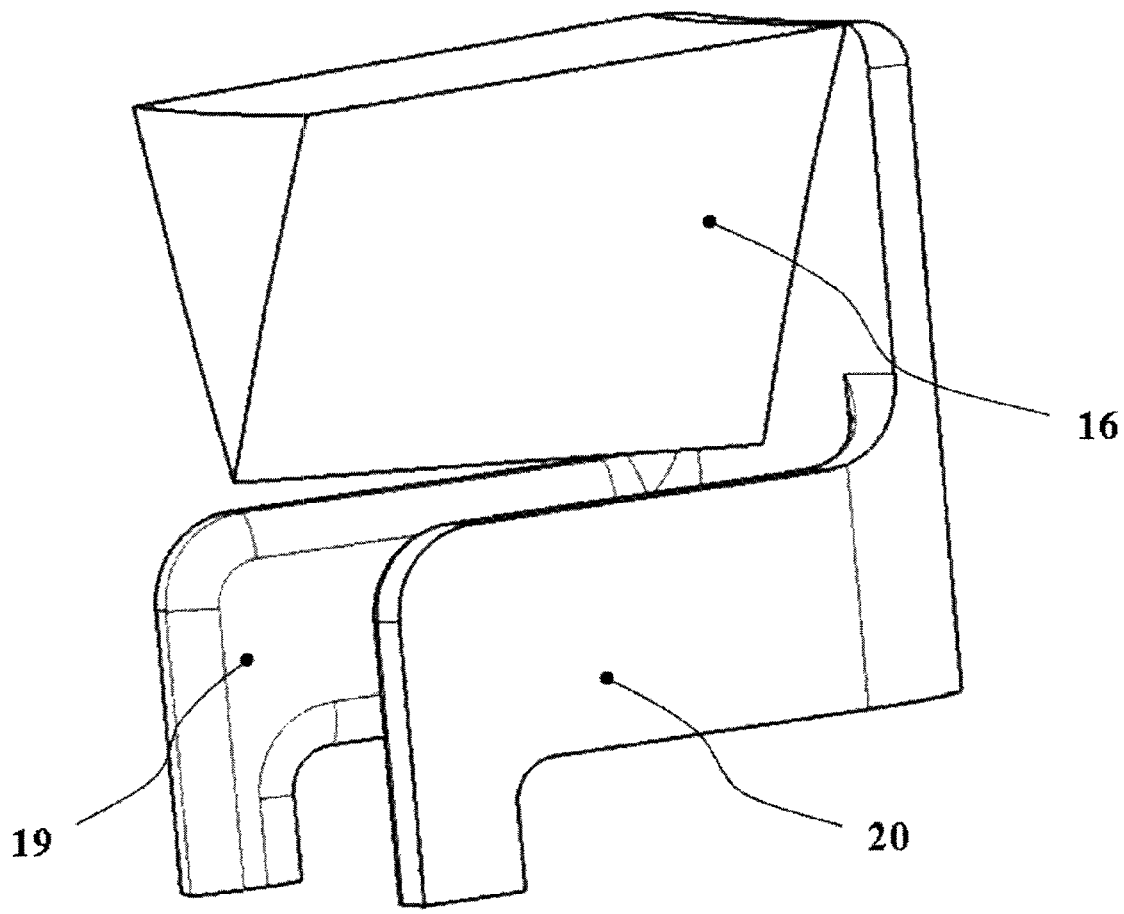
Figure 8:
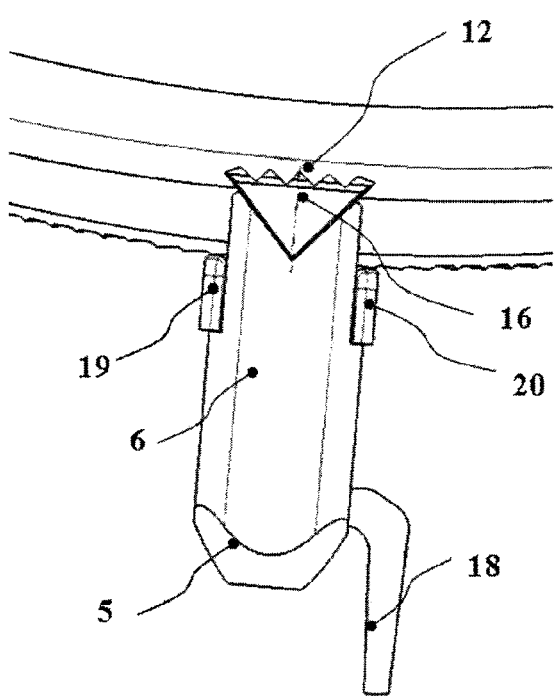
Figure 9:
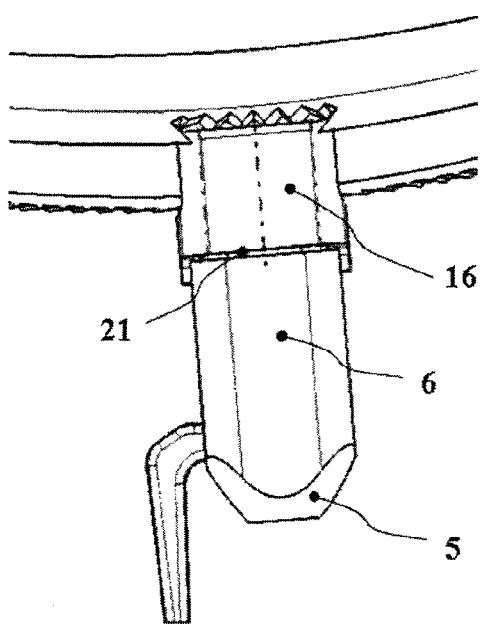
Figure 10:
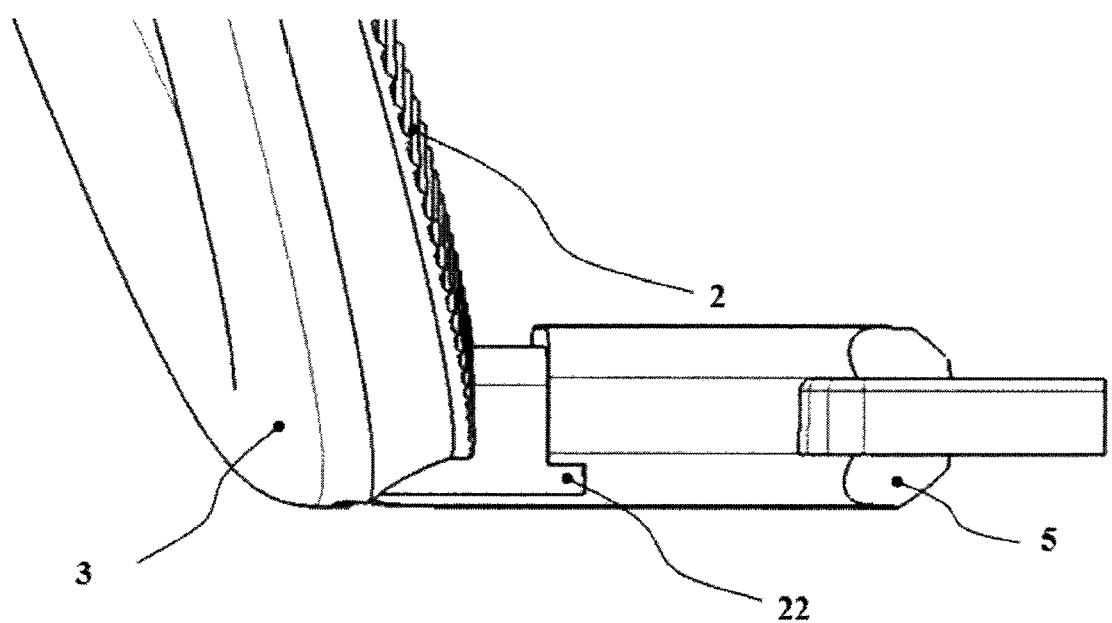

A sample embodiment of the feeding device for a geometrically enclosed lightguide of the signal lamps of motor vehicles is illustrated in the enclosed drawings, where FIG. 1 is a front view of the geometrically closed lightguide and light feed from the side of the cylindrical lens, FIG. 2 is a front view of the geometrically closed lightguide and light feed from the side of the decoupling optics of the lightguide, FIG. 3 is a cross section of the lightguide, FIG. 4 is a detail view of the light feed, FIG. 5 is a magnified cutout with the active surface of the decoupling optics, FIG. 6 is a view of the optical collimator in the direction of the light emanating from the lightguide, FIG. 7 shows the optical insert in magnified view, FIG. 8 is a front view of the device with optical insert in place, FIG. 9 is a side view of the assembly from FIG. 8 and FIG. 10 is a magnified view of the creation of notches for the optical insert.

SPECIFICATION OF A SAMPLE EMBODIMENT OF THE INVENTION

FIGS. 1 and 2 show a sample embodiment of the invention with a circular lightguide 1 highlighting the contour of the circular chamber of a different lighting function of a headlamp or light. The optical device consists of a main lightguide 1 made from highly transparent optical material, such as acrylic PMMA or polycarbonate PC. On the bottom side of the lightguide 1, i.e., the side opposite the desired lighting direction, there are located small teeth as optical decoupling elements 2—see FIG. 5. This comprises precisely calculated notches into the material of the lightguide 1, where the angle x between the facing functional surface 3 of the optical decoupling element 2, formed by the optical notch, i.e., the surface turned toward the light source 17, and the longitudinal axis of the lightguide 1 is defined such as to send the output rays of the emitted light of the lightguide 1 parallel to the longitudinal axis X of the vehicle.

The described lightguide 1 is fully closed, that is, there is no input surface used for feeding from the light source 17. The problem of feeding the lightguide is solved by the use of a light feeder 4 formed by a light collimator 5, which effectively collects light from the light source 17, and then an additional light guide 6, which conducts the light to the collimating parabolic surface 7 of the collimator 5 and the collimating lens 8 of the collimator 5. The light carried by means of the additional light guide 6 impinges on the TIR planar surfaces 10 and 11 of the prism-shaped cavity 9. The planar surfaces 10 and 11 of the prism-shaped cavity 9 form an angle α between them. The two planar surfaces 10 and 11 of the prism-shaped cavity 9 together with the fine optical prisms 12 are already incorporated in the body of the lightguide 1. Light from the optical collimator 5 is conducted directly through the additional light guide 6 to the two planar surfaces 10 and 11 of the prism-shaped cavity 9, where the direction of the light rays is changed and the light rays are totally internally reflected to both ends of the body of the lightguide 1—see FIG. 4.

FIG. 6 is a view of the optical collimator 5 in the direction of the light emitted from the lightguide 1. There is illustrated here the collimating parabolic surface 7 and the central lens 8. These two parts serve to capture the light from the light source 17 and to form a parallel beam of rays, which substantially increases the proportion of rays undergoing total internal reflection on the planar surfaces 10 and 11 and thus discourages unwanted light passing through the TIR prism formed by the cavity 9.

The cavity 9 in the lightguide 1 forming the TIR prism makes its appearance inhomogeneous, both in the unlit and in the lit state, when unwanted light travels constantly through the lightguide 1 despite the use of the TIR prism and creates a spot with increased brightness.

Relative homogeneity in the unlit state is ensured by the fine optical prisms 12 on the output surface of the cavity 9 making up the TIR prism. The length of the fine optical prisms 12 is equal to the diameter of the cylindrical lens 15 forming the output surface of light from the body of the lightguide 1. The cylindrical lens 15 virtually enlarges the optical decoupling elements 2 located on the bottom side of the body of the lightguide 1. The fine optical prisms 12 are therefore designed so as to focus on the optical decoupling elements 2 and so that the lightguide 1 as a whole has a homogeneous appearance in the unlit state.

In the lit state, it is necessary to decrease the unwanted light passing through the planar surfaces 10 and 11 of the cavity 9 forming the TIR prism and then through the fine optical prisms 12 incorporated into the body of the lightguide 1. A partially transparent insert 16 made from a combination of optically transparent material and cloudy material is inserted in the cavity 9 forming the TIR prism. The ratio of optically transparent material and cloudy material controls the light absorption in the partially transparent insert 16 proper. This accomplishes a controlled reduction of the energy of the transmitted light and a suppression of a spot with elevated brightness. On the other hand, some of the light still passes through the partially transparent insert 16 above the overall light feeder 4 of the lightguide 1 and thus there is no formation of a dark spot, which would also disturb the homogeneous appearance of the lightguide 1 in the lit state. The partially transparent insert 16, or the ratio of materials used, controls the intensity of the transmitted light and the precise ratio of materials attunes the intensity to the strength of the light emitted by the lightguide 1.

FIGS. 8 and 9 illustrate the cavity 9 filled by the partially transparent insert 16. The ratio of transparent/cloudy materials used controls the quantity of light passing through the partially transparent insert 16. This transmitted light is formed as unwanted light, for which the condition was not fulfilled for total internal reflection on the planar surfaces 10 and 11.

The appearance of light around the partially transparent insert 16 is absolutely prevented by the notch 22 in the light conductor 6 formed close beneath the cavity 9 forming the TIR prism.

The fixing elements 19 and 20 of the partially transparent insert 16 and also the fixing surface 21 of the partially transparent insert 16 serve both for its precise mounting on the light feeder 4 and for screening out of unwanted light that would otherwise pass around the partially transparent insert 16. The light feeder 4 is supplied by the light source 17, which can be a LED diode placed at the focal point of the collimator 5. The correct position of the LED diode is assured by the fixing pin 18.

INDUSTRIAL UTILITY

The feeding device for a geometrically enclosed lightguide 1 can be used in transportation engineering to create signal lamps of stylistically attractive appearance. The optical system which is the subject matter of this invention can be used for front and rear running light function in headlamps and in rear signal lamps. The optical system enables the use of light-emitting diodes (LED), where the color of the LED diodes determines the applicability of the lighting device.

The invention claimed is:

1. A feeding device for a geometrically closed lightguide (1) of the signal lamps of motor vehicles placed on both sides of the vehicle, characterized in that it consists of a light feeder (4) and a geometrically closed lightguide (1), where both parts are joined and form a single plastic molding, wherein a prism-shaped cavity (9) with total internal light reflection for a uniform light distribution at both sides of the closed lightguide (1) is formed at the site of their joint, and a partially transparent insert (16) is inserted in the prism-shaped cavity (9), made of material with a precise ratio of transparent and cloudy components to control the amount of unwanted light arising on the planar surfaces (10;11) of the prism-shaped cavity (9) with total internal light reflection.

2. The device according to claim 1, characterized in that the prism-shaped cavity (9) contains on its upper surface a structure of fine prisms (12), that are in line with the decoupling elements (2) of the lightguide (1) to preserve a relative homogeneity of the overall lightguide (1) including the region of the light feeder (4) in the unlit state.

3. The device according to claim 1, characterized in that the light feeder (4) contains at its input part an optical collimator (5), focusing the light from a light source (17) and directing the rays directly onto the prism-shaped cavity (9) with total internal light reflection.

4. The device according to claim 1, characterized in that the optical insert (16) placed in the prism-shaped cavity (9) with total internal light reflection is independently fastened in a notch (22) of a light conductor (6).

5. The device according to claim 4, characterized in that the optical insert (16) is provided with fixing elements (19,20) for its precise fixing in the notch (22) of the light conductor (6) and for screening out the light rays around the optical insert (16).

6. The device according to claim 3, characterized in that the light source (17) is an LED diodes.

* * * * *